United States Patent [19]
Idel

[11] 3,929,040
[45] Dec. 30, 1975

[54] BAND-SAW SHARPENING MACHINE

[76] Inventor: Vladimir Viktorovich Idel, ulitsa Gertseoa, 3, kv. 37, Zavolzhie Gorkovskoi oblasti, U.S.S.R.

[22] Filed: Dec. 6, 1974

[21] Appl. No.: 530,521

Related U.S. Application Data

[63] Continuation of Ser. No. 425,836, Dec. 18, 1973, abandoned, which is a continuation of Ser. No. 300,362, Oct. 24, 1972, abandoned.

[30] Foreign Application Priority Data
Oct. 25, 1971 U.S.S.R............................. 1706659
Oct. 25, 1971 U.S.S.R............................. 1706660

[52] U.S. Cl. .................................................. 76/37
[51] Int. Cl.² ........................................ B23D 63/12
[58] Field of Search ....................................... 76/37

[56] References Cited
FOREIGN PATENTS OR APPLICATIONS
545,001   6/1956   Italy ........................................ 76/37

*Primary Examiner*—Frank T. Yost
*Assistant Examiner*—W. R. Briggs
*Attorney, Agent, or Firm*—Holman & Stern

[57] ABSTRACT

A machine for sharpening and setting the teeth of an endless band saw, wherein the saw being sharpened has one of its sides accommodated between the horizontal ways of a device for holding the saw during sharpening of its teeth, while the opposite side of the saw is free to rest upon a supporting element so fixed on the bed that the length of the saw portion located in between the feed mechanism and the supporting element in the direction of saw pitch feed is smaller than the saw portion located in between the feed mechanism and the supporting element in the direction opposite to saw feed motion. This enables the saw driven side to move under its own weight.

5 Claims, 3 Drawing Figures

U.S. Patent  Dec. 30, 1975  3,929,040
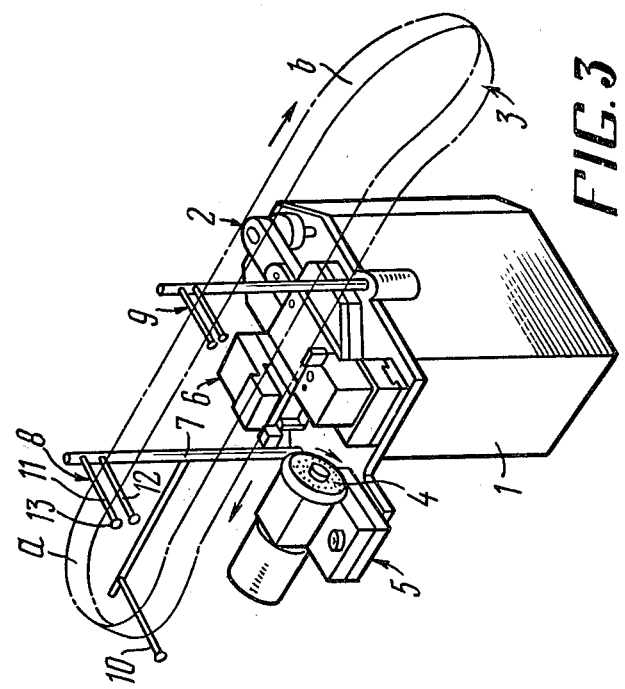
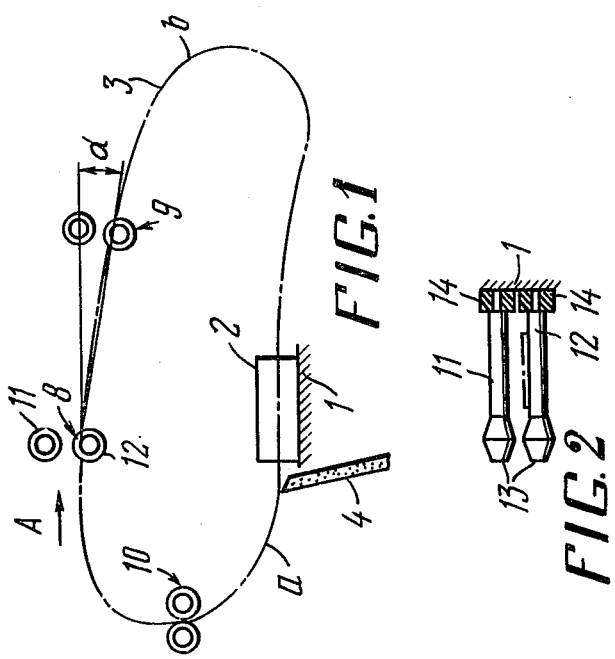

BAND-SAW SHARPENING MACHINE

This is a continuation of application Ser. No. 425,836 filed Dec. 18, 1973, now abandoned which in turn is a Rule 60 Cont. of Ser. No. 300,362 filed Oct. 24, 1972, now abandoned.

BACKGROUND OF THE INVENTION

The present invention relates to machines for sharpening and setting the teeth of endless band saws.

Known in the present state of the art are band-saw sharpening and setting machines, wherein the bed of the machines accommodates a sharpening head with an abrasive wheel and the feed mechanism with a saw holding device. Additionally, the saw teeth mechanism is located on the same bed, the feed mechanism of the saw teeth setting mechanism and the saw holding device being mounted integral with the feed mechanism.

Each of the devices for holding the saw has horizontal ways for the saw to pass therebetween. These ways hold the saw in the course of the teeth sharpening (setting) on its side surfaces.

In the prior known machine, the sharpening head with the feed mechanism and the teeth setting mechanism with its feed mechanism are arranged one above the other, while the horizontal ways of the saw holding devices are parallel to each other.

When sharpening a saw on machines of the known type the saw is placed in between the horizontal ways of its holding device mounted on the mechanism for saw feed with respect to the grinding wheel, while the horizontal ways of the saw holding device, mounted on the mechanism for feeding the saw with respect to the saw teeth setting mechanism, serve as a supporting element. When setting saw teeth the ways of the saw holding device, mounted on the mechanism for saw feed with respect to the grinding wheel serves as a support element (cf., e.g., U.S. Pat. No. 3,611,839, C1.76 issued in the USA).

A disadvantage inherent in the known saw sharpening and setting machines resides in the fact that for a separate sharpening and setting of saw teeth both feed mechanisms are place into operation one at a time with the result that one of these runs idle which affects its service life.

If one of the feed mechanisms is turned off, the driven side of the saw has to be pulled through by hand.

SUMMARY OF THE INVENTION

It is therefore an object of the present invention to make the machine feed mechanism more timeproof.

It is another object of the present invention to dispense with manual operations for pulling the saw through the machine when its teeth are being sharpened or set thereon.

In keeping with these objects a sharpening and setting machine for the teeth of endless band saws, is provided wherein the saw is accommodated in between the horizontal ways of the saw holding device during sharpening or setting the teeth thereof, which device is mounted on the feed mechanism and is free to rest upon at least one supporting element fixedly mounted on the machine bed. According to the invention the supporting element is so fixed on the bed that the saw is free to rest thereon with its side opposite to that accommodated in the horizontal ways in such a way that the length of the saw portion located in between the feed mechanism and the supporting element in the direction of pitch feed is smaller than the length of the saw portion located in between the feed mechanism and the supporting element in the direction opposite to pitch feed.

When two supporting elements are used in the machine, it is expedient that they are so arranged on the machine that the saw side resting thereon be somewhat inclined in the direction of its movement.

Provision of two supporting elements enables but a minimum amount of saw sag required for the saw to move under its own weight.

It is likewise expedient that one additional or auxiliary supporting element be provided and so fixed on the bed that the saw portion located in between the feed mechanism and the supporting element rest thereon at the midpoint thereof.

Such an arrangement of the auxiliary supporting element facilitates saw positioning within the predetermined ratio of the lengths of the portions thereof.

It is no less expedient, in the case where the supporting element is composed of two parts or rollers wherebetween the saw is to pass, that the one of the ends of these two parts terminate in barrel-shaped haunches.

The provision of such barrel-shaped haunches prevents the saw blade from slipping off during teeth sharpening and provides for convenient saw positioning and removing.

To eliminate transverse vibrations of the saw blade in the course of machining, the supporting elements are expediently cushioned on the machine bed.

The band-saw sharpening and setting machine according to the present invention, ensures that the saw driven side moves under its own weight whereby manual operations for pulling through this saw side is eliminated.

BRIEF DESCRIPTION OF THE DRAWING

Given below is a description of a specific exemplary embodiment of the present invention taken with reference to the accompanying drawings, wherein:

FIG. 1 is a general schematic view of a saw teeth sharpening machine;

FIG. 2 is a schematic view of a mutual arrangement of the horizontal ways of the saw holding device and the supporting elements, according to the invention; and FIG. 3 is a view along the arrow A in FIG. 1.

DETAILED DESCRIPTION OF THE PREFERRED EMBODIMENT

In the specific and preferred embodiment of the present invention, an endless band saw teeth sharpening machine is considered; however, all discussed herein refers equally to endless band saw teeth setting machines.

Reference being now directed to FIG. 1, a bed 1 accommodates a mechanism 2 to feed a saw 3 with respect to an abrasive grinding wheel 4 of a sharpening head 5.

The feed mechanism 2 mounts a device 6 for holding the saw 3 in the course of sharpening its teeth. The device 6 has horizontal guide rollers (not shown) in between which the saw is held across its lateral surfaces.

A stand 7 is fixed on the bed 1, which stand carries a supporting element 8 located above the horizontal ways and parallel thereto.

The element 8 is so mounted that the saw 3 is free to rest thereon with its side opposite to that resting upon the horizontal ways, in such a way that the length of a portion $a$ of the saw 3 located in between the feed mechanism 2 and the supporting element 8 in the direction of saw pitch feed, is smaller than the length of a portion $b$ of the saw 3 located in between the feed mechanism 2 and the supporting element 8 in the direction opposite to the saw pitch feed. Another supporting element 9 is mounted on the bed 1 somewhat spaced apart from the supporting element 8 in the direction of the pitch feed of the saw 3. The supporting element 9 is located beneath the supporting element 8 by a difference in height so as to enable the driven side of the saw 3 to move under its own weight. An angle $\alpha$ (FIG. 1) of inclination of the saw 3 (viz., an angle made up by the horizontal line and the line passing through the supporting elements 8 and 9) falls within 5°–20°.

An auxiliary supporting element 10 is mounted on the bed 1 so that the portion $a$ of the saw 3 located in between the feed mechanism 2 and the supporting element 8 rests thereon at its midpoint. The provision of the auxiliary supporting element 10 enables the saw 3 to be quickly and easily positioned within the predetermined ratio of the portions thereof. The auxiliary supporting element can be positioned in such a way that the midpoint of the opposite portion $b$ of the saw rests thereon.

In the herein-considered embodiment of the invention, the supporting elements 8, 9 and 10 are composed each of two parts or rollers 11 and 12 wherebetween the saw 3 is free to pass. Such a construction of the supporting elements ensures against possible slipping of the saw 3 therefrom.

Barrel-shaped haunches 13 are provided at one of the ends of the 11 & 12 which facilitate the positioning and removing of the saw 3, as well as preventing the saw 3 from slipping off while moving.

In order that the supporting elements 8, 9, 10 be capable of damping transverse oscillations of the saw 3, they are mounted on the bed 1 through spring-like elements 14 provided for the other ends of the parts 11 and 12 which in the herein-considered exemplary embodiment are made of rubber.

If the machine has the sharpening and setting mechanisms arranged one above the other, the supporting elements are so mounted on the bed 1 as to be adjustable to suit the operation performed on the machine.

The band saw sharpening machine of the invention operates as follows,

Prior to starting the machine, the saw 3 is placed on the supporting elements 8, 9, 10. When fitting the saw 3 onto the supporting elements 8, 9, 10 and into the horizontal ways of the device 6, its sides are so balanced that the driven side can move under its own weight. Thereupon, the sharpening head 5 and the feed mechanism 2 are placed into operation, and the saw 3 starts moving for a length of its pitch. Due to the fact that the left-hand side of the saw 3 is located above the right-hand side and the latter weighs more, the saw 3 will smoothly move for the same length under its own weight. Thus, the saw driving side moves from the feed mechanism 2, while the driven side thereof, moves under its own weight.

What we claim is:

1. A machine for sharpening and setting the teeth of an endless band saw with its sides stretched in a horizontal plane, comprising: a bed; a cutting tool rigidly mounted on said bed; feeding means for feeding the saw with respect to said cutting tool, mounted on said bed; holding means for holding the saw on its lateral surfaces in the course of machining the teeth thereof, said holding means being mounted in said feeding means and having horizontal ways whereon rests one of the sides of the endless band saw; at least two supporting elements rigidly fixed on said bed for permitting the other side of the saw to rest thereon, said supporting elements being located at different heights from said bed, the first supporting element being nearest the horizontal plane of said bed and also being nearer to said feeding means than the distal portion of the band saw opposite the proximate portion of the band saw supported by said first supporting element whereby the length of the portion of the endless band saw between the feeding means and the supporting elements in the direction of the pitch feed of the sharpening and setting machine, is lesser in length than the length of the portion of the endless saw between said feeding means and said supporting elements in the direction opposite to the pitch feed of the sharpening and setting machine, so that the band saw is free to move under its own weight; and driving means for driving said cutting tool and said feeding means during an operation of the machine.

2. The machine as claimed in claim 1, including a further supporting element mounted on said bed in spaced relationship in the direction of the pitch feed from the second supporting element and located at a height nearer to the horizontal plane of the bed than said second supporting element whereby that portion of the endless band saw resting on said further supporting element is substantially inclined in the direction of the movement of the band saw.

3. The machine as claimed in claim 1, in which said first supporting element is mounted on said bed so that that portion of the saw between said feeding means and said second supporting element rests thereon at its midpoint.

4. The machine as claimed in claim 1, wherein each said supporting element is made of two parts wherebetween the saw is to pass, the ends of said parts having barrel-shaped haunches for preventing the saw from slipping off said supporting element.

5. The machine as claimed in claim 1, including a spring-like element by which each supporting element is mounted on said bed.

* * * * *